US005729191A

United States Patent [19]

Allen et al.

[11] Patent Number: 5,729,191

[45] Date of Patent: Mar. 17, 1998

[54] VEHICLE SECURITY SYSTEM HAVING ENHANCED CONTROL FEATURES

[75] Inventors: Geoffrey C. Allen, Symrna; Kenneth E. Flick, Douglasville, both of Ga.

[73] Assignee: Kenneth E. Flick, Douglasville, Ga.

[21] Appl. No.: 422,517

[22] Filed: Apr. 14, 1995

[51] Int. Cl.[6] ..... B60R 25/10

[52] U.S. Cl. ..... 340/426; 340/539; 340/545; 340/541; 340/825.31; 340/825.32; 340/825.69; 340/825.72; 340/825.73; 307/10.2

[58] Field of Search ..... 340/426, 459, 340/506, 539, 540, 541, 545, 565, 566, 825.31, 825.32, 825.69, 825.72, 825.73, 825.76; 307/10.2

[56] References Cited

U.S. PATENT DOCUMENTS

| | | | |
|---|---|---|---|
| 4,205,300 | 5/1980 | Ho et al. | 340/65 |
| 4,327,444 | 4/1982 | Court | 455/100 |
| 4,383,242 | 5/1983 | Sassover et al. | 340/64 |
| 4,414,541 | 11/1983 | Ho | 340/566 |
| 4,450,437 | 5/1984 | Ho | 340/540 |
| 4,628,400 | 12/1986 | Ho | 361/172 |
| 4,674,454 | 6/1987 | Phairr | 123/179 B |
| 4,754,255 | 6/1988 | Sanders et al. | 340/64 |
| 4,812,814 | 3/1989 | Elliott | 340/332 |
| 4,890,108 | 12/1989 | Drori et al. | 341/176 |
| 4,893,240 | 1/1990 | Karkouti | 364/424.05 |
| 5,024,186 | 6/1991 | Long et al. | 123/179 B |
| 5,040,990 | 8/1991 | Suman et al. | 439/34 |
| 5,049,867 | 9/1991 | Stouffer | 340/426 |
| 5,103,221 | 4/1992 | Memmola | 340/825.31 |
| 5,129,376 | 7/1992 | Parmley | 123/179.2 |
| 5,132,660 | 7/1992 | Chen et al. | 340/428 |
| 5,146,215 | 9/1992 | Drori | 340/825.32 |
| 5,159,334 | 10/1992 | Baumert et al. | 340/825.72 |
| 5,278,547 | 1/1994 | Suman et al. | 340/825.32 |
| 5,285,186 | 2/1994 | Chen | 340/428 |
| 5,309,144 | 5/1994 | Lacombe et al. | 340/539 |
| 5,323,140 | 6/1994 | Boyles | 340/428 |
| 5,467,070 | 11/1995 | Drori et al. | 340/426 |
| 5,469,151 | 11/1995 | Lavelle et al. | 340/825.36 |

FOREIGN PATENT DOCUMENTS

| | | | |
|---|---|---|---|
| WO 92/02702 | 2/1992 | European Pat. Off. | E05B 49/00 |

*Primary Examiner*—Jeffery Hofsass
*Assistant Examiner*—Daryl C. Pope
*Attorney, Agent, or Firm*—Allen, Dyer, Doppelt, Milbrath & Gilchrist, P.A.

[57] ABSTRACT

A vehicle security system includes a controller for performing a function responsive to receipt of a corresponding command signal, and a remote transmitter for sending a command signal from a plurality of banks of command signals. More particularly, the remote transmitter includes a plurality of first momentary contact switches for transmitting a first respective command signal responsive to depressing the switch for less than a first time and for transmitting a second respective command signal responsive to depressing the switch for more than the first time. The remote transmitter also includes a bank selector switch for selecting one of the plurality of banks of command signals. A valet switch is included for placing the controller in a valet mode, such as to permit a service technician or valet to use the vehicle without triggering an alarm. The controller permits switching to the valet mode responsive to activating the valet switch whether the ignition switch is on or off and the controller is in the disarmed mode. Method aspects of the invention are also disclosed.

25 Claims, 5 Drawing Sheets

VEHICLE SECURITY SYSTEM HAVING ENHANCED CONTROL FEATURES

FIELD OF THE INVENTION

The present invention relates to the field of security systems and, more particular, to a security system for installation in a vehicle.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may also used as sensors. In addition, radar sensors may be used to monitor the area proximate the vehicle. The controller also typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitter units typically carried by the user as disclosed, for example, in U.S. Pat. No. 4,383,242 to Sassover et al. The remote transmitter may be used to arm and disarm the controller in the vehicle or provide other remote control features from a predetermined range outside the vehicle.

As disclosed in U.S. Pat. No. 5,049,867 to Stouffer and U.S. Pat. No. 5,146,215 to Drori, the controller may include features to store and compare unique codes associated with a plurality of remote transmitters, each remote transmitter having its own unique code initially programmed therein. Transmitter codes may be added or deleted from the controller corresponding to the number of remote transmitters desired by the users.

A relatively large number of functions may desirably be implemented by a remote transmitter; however, individual switches for each function may not be easily included in the limited space available for a typical handhold remote transmitter. Accordingly, a relatively small number of switches may be configured, such as with decrement or increment capability to provide additional control functions, as disclosed, for example, in U.S. Pat. No. 4,890,108 to Drori et al. The patent also includes a decade switch to provide quicker access between functions and a display to indicate the selected function or channel. Unfortunately, the operation of such a remote transmitter may be confusing or awkward. In addition, the number of features may still be relatively limited.

In addition, a typical security system includes a valet switch, for example, to permit the system to enter the so-called valet mode, wherein the alarm functions are disabled. The valet mode permits authorized use the vehicle by a technician or valet without concern for the vehicle alarm inadvertently being triggered. Typically, the valet switch is positioned away from plain view in the vehicle. To enter the valet mode it is typically required that the ignition be in the on position. Unfortunately, this requirement may be very inconvenient for the user.

A vehicle security system sold under the mark VIPER included the ability to enter the valet mode via a remote transmitter. The remote activation disabled security features of the system, but left convenience features still operable.

Many other features may be incorporated into a vehicle security system. For example, as disclosed in U.S. Pat. No. 4,887,064 to Drori et al. the controller may include self-diagnostics. In the event of a sensor failure, the controller will bypass the sensor, permit arming of the system, and the bypassed sensor will not cause activation of the alarm. A flashing LED, sound signal, or voice message may be used to give an indication of that the alarm has been triggered. The audible alarm signal may be selected by the user. An alarm may also be given when power is restored after having been disconnected, as when a thief disconnects the power to avoid the security system and attempts to then start the vehicle. An LED is mounted on the vehicle instrument panel or dashboard so that the controller may visually communicate with the user. A keypad may also be mounted within the vehicle to permit the user to program certain features of the security system. Control functions may also be implemented by the security system including: accessory, pulsed alarm, hood release, ignition cutoff, door lock and unlock.

A vehicle security system may also include a passive arming feature wherein the status of all trigger inputs is monitored in several protection zones. These zones may include the passenger compartment, the engine compartment, the trunk, and additional sensor zones such as for motion, impact, and or glass breakage. When the ignition key is turned off, the system begins the passive arming process. If all zones are secure, normal arming occurs after expiration of an exit delay. If any zone becomes active during the exit delay, the process begins again. U.S. Pat. No. 4,754,255 to Sanders et al. discloses a variation of passive arming wherein any unsecured zone is monitored when the ignition key is turned off.

SUMMARY OF THE INVENTION

In view of the foregoing background it is therefore an object of the present invention to provide a vehicle security system and related method including a handheld remote transmitter capable of implementing a relatively large number of functions from a limited number of switches.

It is another object of the present invention to provide a vehicle security system and related method facilitating easy switching into a valet mode.

These and other objects, features, and advantages according to the present invention are provided by a vehicle security system comprising a controller for performing a predetermined one of a plurality of functions responsive to receipt of a predetermined command signal, and a remote transmitter for sending to the controller a predetermined command signal from a plurality of banks of command signals. More particularly, the remote transmitter includes command means comprising a plurality of first momentary contact switches and means associated with each switch for transmitting a first respective command signal responsive to depressing the switch for less than a first time and for transmitting a second respective command signal responsive to depressing the switch for more than the first time. In other words, respective first and second command signals for the plurality of first switches define a corresponding bank of command signals from the plurality of banks of command signals.

Moreover, the remote transmitter also preferably comprises bank selector means operatively connected to the command means and comprising a second switch and means associated therewith for selecting one of the plurality of banks of command signals for the command means. Accordingly, not only can each switch transmit two commands depending on the length of time depressed, but a plurality of banks of such first and second commands may be transmitted through use of a second momentary contact switch to select different banks of command signals. The second switch is preferably a momentary contact switch and includes means associated therewith for incrementing to a next bank of command signals responsive to depressing the second momentary contact switch for less than a second time.

Another feature of the invention is that the display means, such as an LED may be provided on the remote transmitter housing. The LED may indicate the bank of command signals currently selected responsive to depressing the second switch for more than the second time. In addition, the LED may be lighted responsive to release of one of the plurality of first momentary contact switches and remain lighted until the transmission is complete.

Another aspect of the invention relates to operation of a valet switch for placing the controller in a valet mode, such as to permit a service technician or valet to use the vehicle without triggering an alarm. The controller is operatively connected to a vehicle sensor, alarm indication means, and the valet switch. The controller is switchable between an armed mode, a disarmed mode, and a valet mode. The controller in the armed mode is capable of generating an alarm responsive to triggering of a vehicle sensor, and in the disarmed mode prevents generating an alarm responsive to triggering of a vehicle sensor and switching to the armed mode after a predetermined time. The controller in the valet mode prevents generating an alarm responsive to triggering of a vehicle sensor. Moreover, the controller preferably further comprises: ignition monitoring means for determining whether a vehicle ignition switch is in an off position or an on position, and valet control means for permitting switching to the valet mode responsive to activating the valet switch whether the ignition switch is on or off and while the controller is in the disarmed mode. Thus, the vehicle security system may be readily placed in the valet mode without concern for whether the ignition is in the on position and as long as the controller is disarmed.

The controller preferably further comprises signature valet means for permitting entry into the valet mode from the armed mode only if the vehicle ignition switch is on, and the valet switch is activated a predetermined plurality of times within a predetermined time. In other words, if the owner loses his remote transmitter and must enter the vehicle with the security system armed, the alarm will sound. The owner may then switch the controller to the valet or disarmed mode by pressing the valet switch a predetermined plurality of times within a predetermined time to thereby silence the alarm and permit normal operation of the vehicle. Accordingly, the signature valet means further preferably comprises selection means for permitting user selection of the predetermined number of times for activation of valet switch to enter the disarmed mode from the armed mode.

A first method aspect of the invention is for operating a remote transmitter of a vehicle security system for sending predetermined command signals from a plurality of banks of command signals to a vehicle security system controller, the remote transmitter comprising a plurality of first momentary contact switches. The method preferably comprises transmitting a first respective command signal responsive to depressing one of the plurality of first momentary contact switches for less than a first time and transmitting a second respective command signal responsive to depressing one of the switch for more than the first time. The respective first and second command signals for the plurality of first switches define a corresponding bank of command signals from the plurality of banks of command signals. The method further includes selecting one of the plurality of banks of command signals for the plurality of first momentary contact switches.

The step of selecting one of the banks comprises the steps of: providing a second momentary contact switch, and incrementing to a next bank of command signals responsive to depressing the second momentary contact switches for less than a second time. The method further preferably includes the step of indicating the bank of command signals currently selected responsive to depressing the second switch for more than a second time.

The step of transmitting preferably comprises transmitting a respective command signal responsive to release of a depressed one of the first plurality of momentary contact switches. In addition, the method preferably further comprises reverting back to a predetermined bank of command signals responsive to a failure to depress one of the plurality of first momentary contact switches within a third time.

Another method aspect according to the invention is for operating a vehicle security system comprising a controller switchable between an armed mode, a disarmed mode, and a valet mode, the controller in the armed mode being capable of generating an alarm responsive to triggering of a vehicle sensor, the controller in the disarmed mode preventing generating an alarm responsive to triggering of the a vehicle sensor and switching to the armed mode after a predetermined time, and the controller in the valet mode preventing generating an alarm responsive to triggering of the a vehicle sensor. The method preferably comprises the steps of: providing a valet switch accessible to a user within the vehicle; and switching to the valet mode responsive to activating the valet switch when a vehicle ignition switch is in one of an on position and an off position and the controller is in the disarmed mode. The method preferably further includes the step of permitting entry into the valet mode or the disarmed mode from the armed mode only if the vehicle ignition switch is in the on position, and the valet switch is activated a predetermined plurality of times within a predetermined time. Accordingly, the method may further include the step of first selecting the predetermined number of times for activation of the valet switch to enter the valet or disarmed modes from the armed mode.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
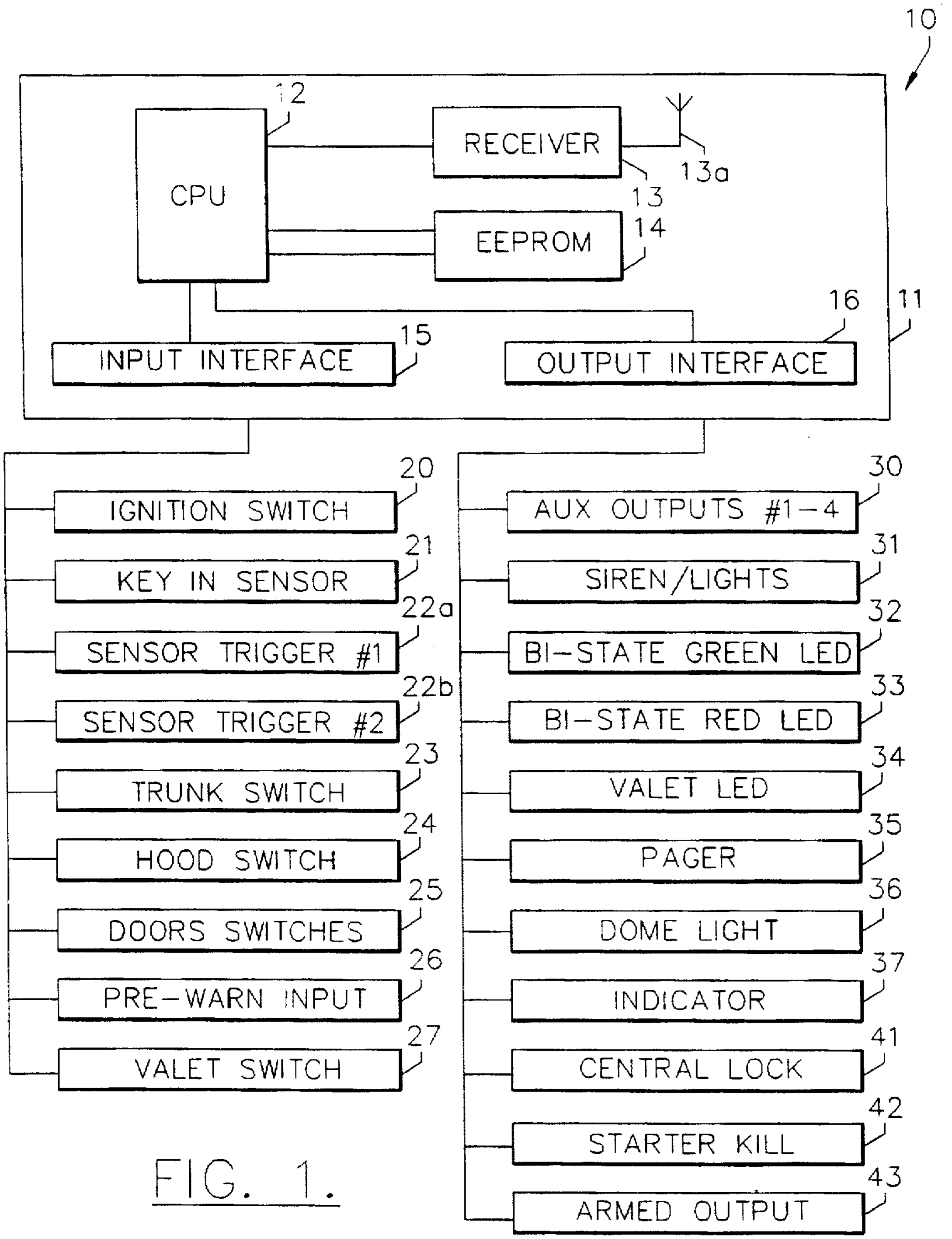
FIG. 1 is a schematic block diagram of the vehicle security system according to the invention.

Referring first to the schematic block diagram of FIG. 1, the vehicle security system 10 according to the invention is first described. The security system includes a controller 11 which, in turn, in the illustrated embodiment, includes a central processing unit or microprocessor 12 operating under stored program control. A receiver 13 is connected to the microprocessor 12 for receiving signals from a remote transmitter as will be described in greater detail below. An antenna 13a is illustratively connected to the receiver 13. In the illustrated embodiment, the microprocessor is also operatively connected to a memory (EEPROM) 14 and a conventional input interface 15 and an output interface 16.

In the illustrated embodiment, the input interface 15 is connected to various vehicle inputs including: an ignition switch 20; a key in the ignition sensor 21; two zone sensors 22a, 22b; and conventional trunk hood and door pin switches 23, 24, and 25, respectively. In addition, a pre-warn sensor 26 and valet switch 27 also provide inputs to the controller 11 in the illustrated embodiment. As would be readily understood by those skilled in the art, other inputs are also contemplated by the present invention and all are generally described herein by the term sensor.

The output interface 16 of the controller 11 may preferably be connected to a plurality of outputs. As shown in FIG. 1, the outputs may include auxiliary relay outputs 30, such as for window control or remote starting, as would be readily understood by those skilled in the art. A siren and/or lights 31, and green and red light emitting diodes (LEDs) 32, 33 for dashboard mounting are also connected to the controller 11. Other outputs are directed to a valet LED 34, a dome light 36, and indicator 37, a central lock 41, a starter kill circuit 42, and an armed relay output 43.

Figure 2:
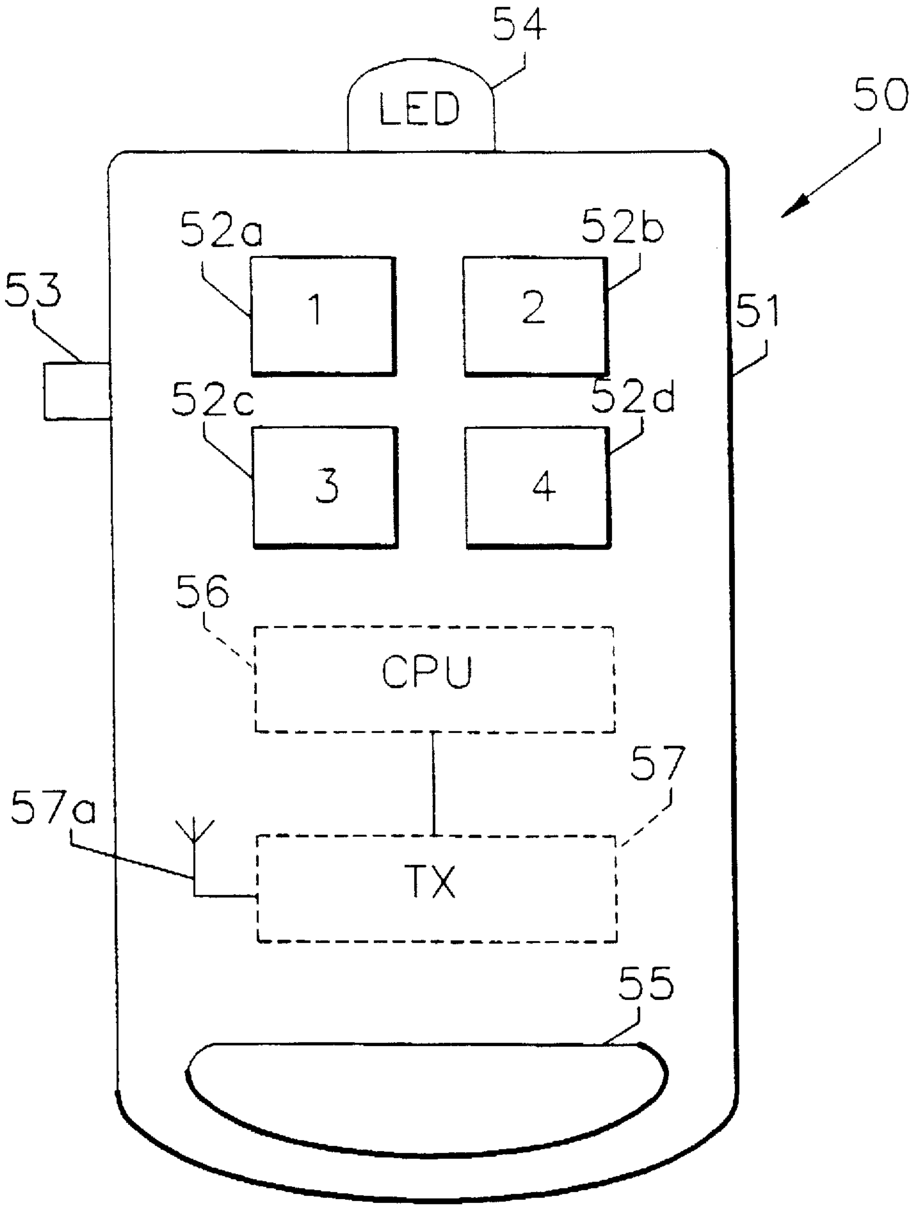
FIG. 2 is a schematic block diagram of a remote transmitter for use with the vehicle security system according to the invention.

Referring now additionally to FIG. 2, a remote transmitter 50 in accordance with the invention is described. The remote transmitter 50 includes a housing 51 and a plurality of first momentary contact switches 52a–52d carried by the housing. A second momentary contact switch 53 and an indicating light, such as the LED 54 are also carried by or mounted on the housing 51. As would be readily understood by those skilled in the art, the remote transmitter 50 is typically relatively small and includes an opening 55 for facilitating connection to a vehicle keyring. In addition, the remote transmitter 50 includes a central processing unit or microprocessor 56 operatively connected to the plurality of first switches 52a–52d, the second switch 53, and the LED 54. The microprocessor is also connected to a transmitter circuit 57 and its associated antenna 57a for transmitting signals to the controller 11 of the vehicle security system 10.

Figure 3:
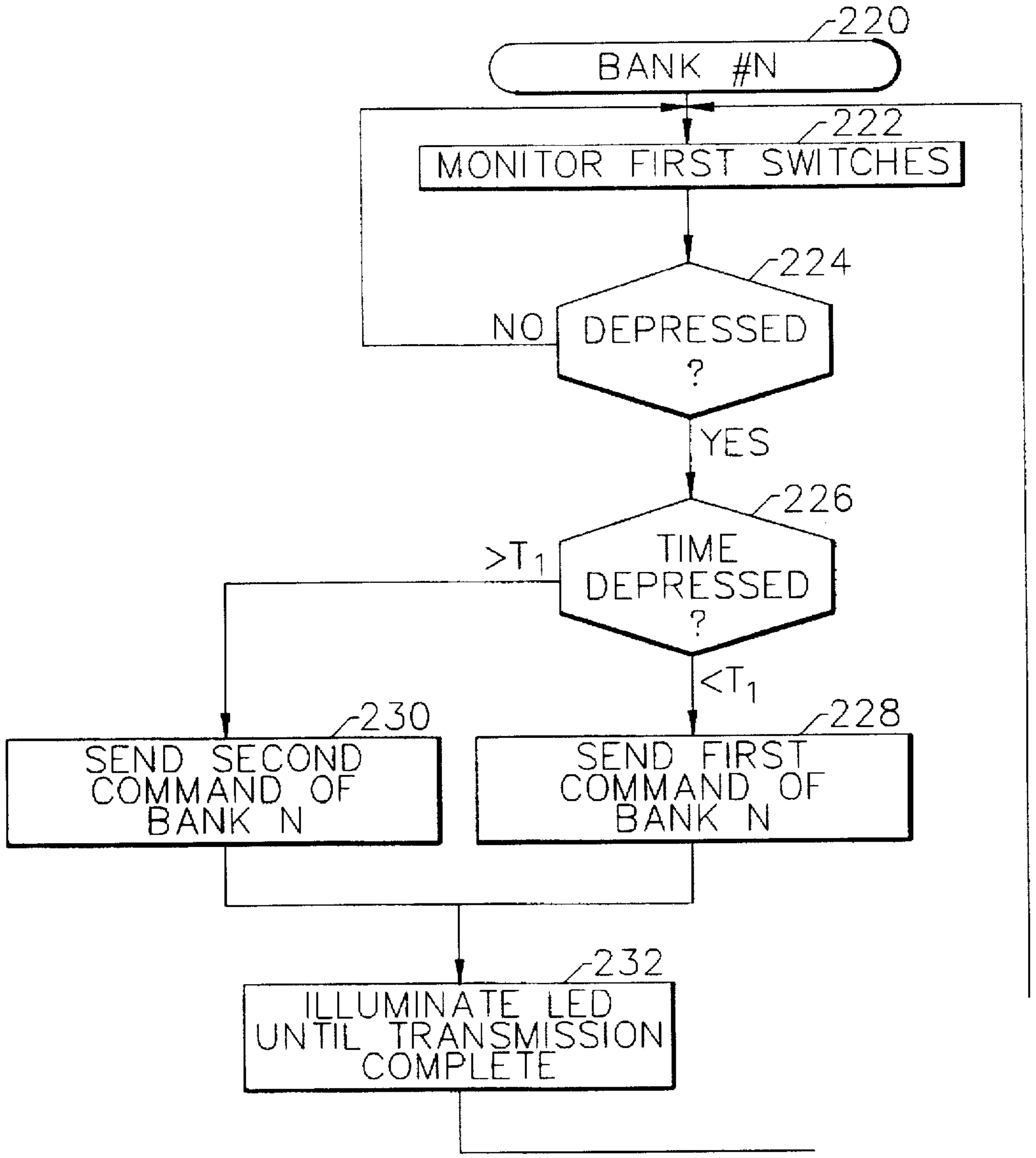
FIG. 3 is a flow chart illustrating selection of a first or second command signal from a remote transmitter switch according to the invention.
Figure 4:
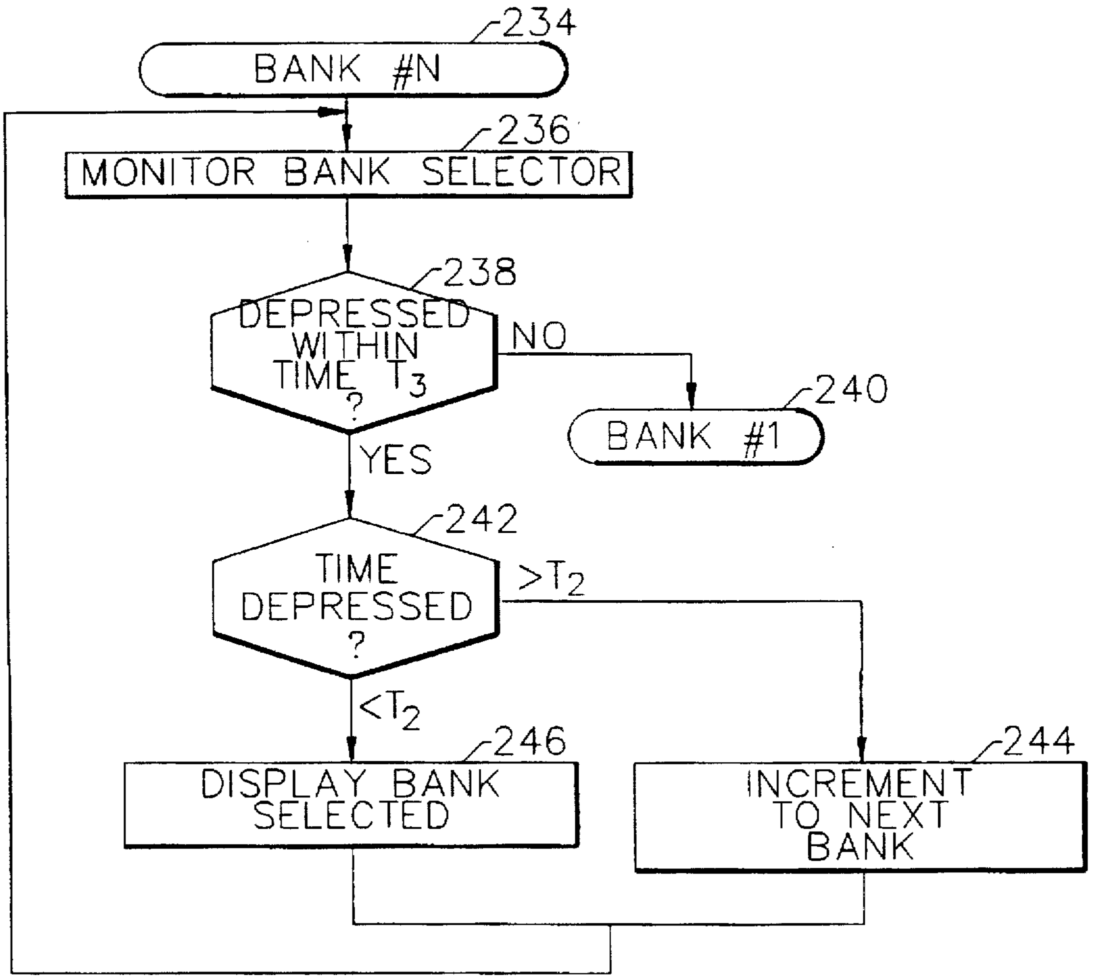
FIG. 4 is a flow chart illustrating selection of a command signal bank of the remote transmitter according to the invention.

Referring now additionally to the flow charts of FIGS. 3 and 4, the operation of the controller 11 and remote transmitter 50 are further described. In particular, the controller 11 is preferably capable of performing a predetermined one of a plurality of functions responsive to receipt of a predetermined command signal from the remote transmitter 50. In particular, the remote transmitter 50 is capable of sending to the controller 11 a predetermined command signal from a plurality of banks of command signals, as described below in greater detail.

More particularly, the remote transmitter 50 includes command means comprising a plurality of first momentary contact switches 52a–52d and means associated with each switch for transmitting a first respective command signal responsive to depressing the switch for less than a first time and for transmitting a second respective command signal responsive to depressing the switch for more than the first time. Respective first and second command signals for the plurality of first switches define a corresponding bank of command signals from the plurality of banks of command signals. As shown in FIG. 3, if the remote transmitter is at Bank #N (Block 220), the microprocessor 56 monitors the plurality of first switches 52a–52d at Block 222. If a switch is depressed for a time less than $T_1$, such as less than two seconds, (Blocks 224 and 226) the first command signal of Bank #N is transmitted (Block 228). Similarly, if the switch is depressed for a time greater than $T_1$, the second command associated with Bank #N and the particular switch is transmitted at Block 230. In either case, the LED 54 is preferably illuminated upon release of the switch and until the transmission is complete (Block 232).

Referring more particularly to FIG. 4, command signal bank selection is further described. The microprocessor 56 monitors the bank selector or second momentary contact switch 53 at Block 236 while Bank #N is selected (Block 234). If the second momentary contact switch is depressed within a third time $T_3$, such as about thirty seconds, as shown in Block 238, the time of depression of the switch is then determined and compared against a second time $T_2$, such as two seconds (Block 242). If thirty seconds expires before the second switch is depressed in this illustrated embodiment, the remote transmitter 50 reverts back to Bank #1. Alternately, the last bank selected may remain in memory until another bank is selected.

If the second switch 53 is depressed for greater than two seconds, the LED is flashed a number of times corresponding to the number of the bank which is currently selected (Block 246). If the second switch 53 is depressed for greater than $T_2$, the microprocessor increments to the next bank of command signals, that is, Bank #N+1 (Block 244). For example, in one embodiment of the invention, four banks of command signals may be available. Accordingly, if the microprocessor is on Bank #4, a subsequent depressing of the second switch will revert the remote transmitter back to Bank #1.

Display means, such as the LED 54 may be provided on the remote transmitter housing 51. The LED may indicate the bank of command signals currently selected responsive to depressing the second switch for more than a second time. In addition, the LED may be lighted responsive to release of one of the plurality of first momentary contact switches 52a–52d and remain lighted until the transmission is complete.

In different terms, the remote transmitter 50 also comprises bank selector means operatively connected to the command means and comprising a second switch 53 and means associated therewith for selecting one of the plurality of banks of command signals for the command means. Accordingly, not only can each switch 52a–52d transmit two commands depending on the length of time depressed, but a plurality of banks of such first and second commands may be transmitted through a use of a second momentary contact switch 53 to select different banks of command signals. Accordingly, a relatively large number of functions or features are readily selectable by the user in a clear and straightforward format. In addition, each switch 52a–52d can be made relatively large and easily manipulated while the size of the transmitter housing 51 permits it to be readily held in the hand of the user.

Another aspect of the invention relates to operation of a valet switch 27 for placing the controller 11 in a valet mode, such as to permit a service technician or valet to use the vehicle without triggering an alarm. The controller 11 is switchable between an armed mode, a disarmed mode, and a valet mode. The controller 11, in the armed mode is capable of generating an alarm responsive to triggering of a vehicle sensor, and in the disarmed mode prevents generating an alarm responsive to triggering of a vehicle sensor. In the disarmed mode, the controller 11 may preferably enter a passive arming cycle and therefore enters the armed mode after a predetermined time. As would be readily understood by those skilled in the art, the controller 11 in the valet mode prevents generating an alarm responsive to triggering of a vehicle sensor.

The controller 11 preferably further comprises: ignition monitoring means for determining whether a vehicle ignition switch 20 is in an off position or an on position, and valet control means for permitting switching to the valet mode responsive to activating the valet switch 27 whether the ignition switch is on or off and the controller 11 is in the disarmed mode. Thus, the vehicle security system 10 may be readily placed in the valet mode without concern for whether the ignition is in the on position and as long as the controller 11 is disarmed.

Figure 5:
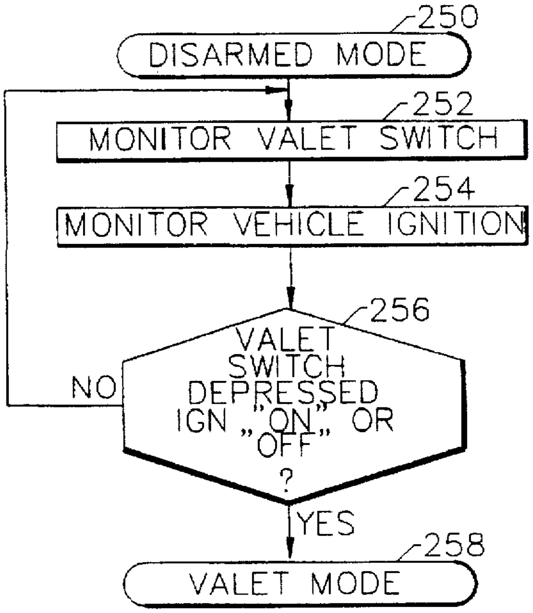
FIG. 5 is a flow chart illustrating operation of a valet switch when the security system is in a disarmed mode according to the invention.

As shown in FIG. 5, the controller 11 when in the disarmed mode 250, monitors the valet switch (Block 252) and the vehicle ignition at Block 254. If the valet switch 27 is depressed whether the ignition is on or off (Block 256), the controller will enter the valet mode (Block 258). Accordingly, entry into the valet mode is facilitated.

Figure 6:
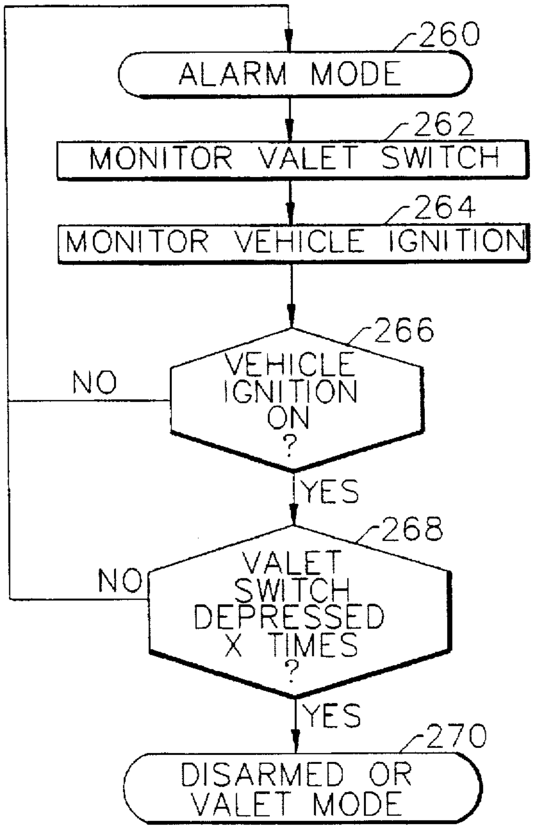
FIG. 6 is a flow chart illustrating operation of a valet switch when the security system is in an alarm mode according to the invention.

As shown in the flow chart of FIG. 6, security is still provided as when the vehicle security system 10 is armed and the alarm is being indicated. More particularly, if the vehicle is in the alarm mode (Block 260). The controller 11 monitors the valet switch 27 (Block 262) and the vehicle ignition 20 (Block 264). The controller 11 preferably further comprises signature valet means for permitting entry into the valet mode or the disarmed mode (Block 270) from the armed mode only if the vehicle ignition switch is on (Block 266), and the valet switch is activated a predetermined plurality of times within a predetermined time (Block 268).

In other words, if the owner loses his remote transmitter 50 and must enter the vehicle with the security system armed, the alarm will sound. The owner may then switch the controller 11 to the valet or disarmed mode by pressing the valet switch 27 a predetermined plurality of times within a predetermined time to thereby silence the alarm and permit normal operation of the vehicle. Accordingly, the signature valet means further preferably comprises selection means for permitting user selection of the predetermined number of times, such as three times, for example, for activation of valet switch to enter the valet or disarmed mode from the alarm mode.

Returning again to the feature of banks of command signals, all buttons 52a–52d on the transmitter 50 that control the various functions of the system will transmit a different code or protocol each and every time one of the buttons on the transmitter is pressed. The table defined below illustrates an embodiment of an assignment of the 4 buttons related to the functioning of the vehicle security system 10:

| Button | Duration | Function |
|---|---|---|
| 1 | Momentary | Arm/Disarm the system |
| 1 | Two Seconds | Remote Panic |
| 2 | Momentary | Stealth Arm/Disarm |
| 2 | Two Seconds | Pulsed output on aux. #1 |
| 3 | Momentary | Timed output on aux. #2 |
| 3 | Two Seconds | Timed output on aux. #3 |
| 4 | Momentary | Timed output on aux. #4 |
| 4 | Two Seconds | Controlled Access Valet |

The second switch 53 carried by the transmitter housing 51 may increment to the next bank of features when momentarily depressed. If held depressed, the transmitter causes display of the current bank as indicated by flashing of the LED 54. In addition, once a bank besides bank #1 has been selected and no further input is detected by the microprocessor 56, the transmitter 50 may revert back to bank #1 after thirty seconds.

The bi-state LED 54 carried by the remote transmitter housing 51 may display information in the following format. For buttons 52a–52d, the LED is illuminated steady RED for the duration of transmission whether depressed less than or more than two seconds. If the second switch 53 is depressed less than two seconds, the LED flashes GREEN in accordance with bank selected, i.e., if bank 1 is selected, the GREEN LED will flash once. Similarly, of the second switch 53 is depressed more than two seconds, the LED 54 indicates the current bank that the transmitter is in, i.e., if bank 4 is selected, the LED will flash GREEN 4 times. As long as the second switch is held depressed, the LED will continue to flash its current bank with pauses between flashes.

The last feature bank selected may alternately be stored in memory along with its associated coding protocols, and remain stored until such time that the bank is changed. Each and every time that the transmitter buttons are activated, the transmitter will transmit the code associated with the bank selected. Transmission of a code occurs when the button is released. The LED will remain on even once the transmitter button has been released, and until such time that the transmission is complete. The vehicle security system 10 may have the ability to learn one of the 4 banks from any four independent remote transmitters 50, or all four banks from a single remote transmitter.

While the vehicle is being driven, the security system 10 is in the drive or free mode and the following outputs will be switched off:

AUXILIARY #1 OUTPUT
AUXILIARY #2 OUTPUT
AUXILIARY #3 OUTPUT
AUXILIARY #4 OUTPUT
SIREN OUTPUT
BI-STATE LED (G)
BI-STATE LED (R)
VALET LED OUTPUT
VALET LED OUTPUT
PAGER OUTPUT
DOME LIGHT OUTPUT
INDICATOR OUTPUT
CENTRAL LOCK OUTPUT

STARTER KILL OUTPUT

ARMED OUTPUT 500 mA

In addition, while the vehicle is being driven, the following inputs will also be ignored:

KEY IN SENSOR +/−

SENSOR TRIGGER #2

SENSOR TRIGGER #1

TRUNK

HOOD

DOORS +/−

PRE-WARN INPUT

While the vehicle is in the drive mode, the system will respond to a remote panic if button #1 **52*a* on the remote transmitter 50 is pressed for two seconds. When the ignition switch of the vehicle is turned to the on position, the system 10** will check to see if Door Lock Ignition On is selected. If selected, the doors will lock in accordance with the programmed time parameter. When the ignition switch of the vehicle is turned to the on position, the system will check to see if the full valet has been selected. If selected, the Bi-State LED will light up orange.

Switching off the ignition will revert the system to the disarmed mode state. The bi-State LED will indicate one of the following states:

| | |
|---|---|
| STEADY RED LED | System Disarmed |
| FLASHING GREEN LED | Partial Valet Selected |
| STEADY GREEN LED | Full Valet Selected |

Upon detection that the ignition switch has been turned off, the system will check to see if the dome light on has been selected, and check to see if the ignition key is in the ignition or not. If selected, the dome light will turn on. If the ignition key has not been removed from the ignition switch, the dome light will remain on, and the system 1O will respond to a remote panic signal, and turning on the ignition which reverts the system to the free mode.

As long as the ignition key is detected in the ignition switch, the dome light will remain on, and the system 10 will not change state. If the key is left in the ignition switch and the last entry/exit point is closed, the system will initiate a audible and visual indication that the key has been left in the ignition. This will continue until such time that the key is removed from the ignition switch. If the ignition key has been removed from the ignition switch, the system will start a 30 second timer. If nothing else occurs, upon expiry of the 30 second timer, the dome light will switch off. The system will wait until such time that the system detects the opening and closing of a door. During the period of waiting for a door to be opened and closed, the system 10 will respond to any of the buttons on the remote transmitter 50.

After closing the last door with the key out of the ignition, the system initiates a 30 second timer during which time the system will respond to any of the following conditions:

a) Check for a arm/disarm code from the remote transmitter. If a valid code is received, the system will react to the programmed condition which is to initiate the arming condition.

b) Check for a panic code from the remote transmitter. If a valid code is received, the system will react to the programmed panic condition.

c) Check for partial valet code from the remote transmitter. If a valid code is received, the system will react to the programmed condition which is a flashing GREEN LED.

d) Check for an auxiliary #1 to #4 code from the remote transmitter. If a valid code is received, the output will react to the programmed condition. This output can be either latched or pulsed.

e) Check for valet forgery. If the incorrect sequence is attempted, the system will revert to its programmed condition.

f) Monitor the pre-warn input. If detected, the system will revert to passively arming the system.

If the key is inserted into the ignition before the expiry of the 30 second timer, then the system will revert to waiting until such time that the key is removed. If the ignition switch is turned on the system 10 will revert to the free mode.

Upon the expiry of the 30 second timer, the system will change state to arming the system 10 as follows: chirp the siren twice, flash the indicators twice, lock the doors, if selected in the lock doors with auto arming, and flash the RED LED fast for alarm arming.

Active arming of the vehicle security system 10 is a default and the system will respond to button #1 **52*a* or button #2 52*b* on the remote transmitter 50. Button #1 on the remote transmitter arms the system with audible sounds. Button #2 arms the system with no sounds, that is, stealth arms the system. If the key is left in the ignition, the system 10 will not respond to the remote transmitter 50**.

Once the ignition key has been removed and the system 10 detects a valid code from the remote transmitter 50, the system will react as follows: chirp the siren twice, flash the indicators twice, lock the doors, flash the RED LED fast for alarm arming, and switch on the armed output.

At this point in time two events occur namely: a 30 second alarm arming timer will be initiated, and the system 10 will run a complete diagnostic of all sensor and pin circuits, that is, run a sensory auto test and report. Should a sensor or pin circuit not come on line properly, then the system will revert to suspending the arming cycle. Should the ignition switch be turned on at this point in time, the system 10 will revert to the free mode.

During the 30 second alarm arming condition, if button #1 or #2 is pressed, the system 10 will revert to the fully armed mode and sound the chirps according to which button was pressed and accordingly: chirp the siren twice, flash the indicators twice, and flash the RED LED slow. If no reception of a code from the remote transmitter 50 is received, then upon the expiry of the 30 second alarm arming timer, the following events will take place: chirp the siren twice, flash the indicators twice, flash the RED LED slow for a alarm armed.

The vehicle security system is now in the armed mode and will monitor the following vehicle sensor inputs for a trigger condition:

IGNITION INPUT

DOORS+/−

PRE-WARN INPUT

VALET INPUT

SENSOR TRIGGER #1

SENSOR TRIGGER #2

HOOD

TRUNK

The security system 10 may be passively armed based upon monitoring the last entry/exit point. Passive arming is a system default, and must be programmed out if not required. If passive arming has been selected, the system be will arm by monitoring the last entry/exit point on the vehicle. If the key is left in the ignition, the system will not respond to passively arming the system. Once the ignition key has been removed and the system detects the closure of the last entry/exit point, the system will initiate a 30 second timer. Upon the expiry of the 30 second timer, the system will chirp the siren twice, flash the indicators twice. In addition, the doors will be locked only if selected in the user program. The default is that the doors will not lock. The RED LED will flash fast indicating that the alarm is arming. A complete diagnostic of all sensor and pin circuits will be run, that is, the sensory auto test and report. Should a sensor or pin circuit not come on line properly, the system will revert to suspending the arming cycle.

If while in the arming cycle, a code from the remote transmitter 50 is detected, the doors will lock. Should the ignition switch be turned on at this point in time, the system will revert to the free mode.

The system is now in the armed mode and will monitor the following inputs for a trigger condition:

IGNITION INPUT
SENSOR TRIGGER #2
SENSOR TRIGGER #1
TRUNK
HOOD
DOORS+/−
PRE-WARN INPUT
VALET INPUT

If the passive arming mode is programmed out, and the system 10 detects the last entry/exit point being closed, the system will remain in the disarmed state (steady red LED).

When an alarm condition is detected by the system 10, the siren will switch on for the selected programmed time duration. The system default of the siren duration is 30 seconds, but this time parameter may be changed in the installer program to one of the following time parameters: 60, 90, or 120 seconds.

When the alarm condition is activated, the following occurs: the starter kill circuit becomes active, the pager output switches on, and the hazards and interior light flash in unison with the siren.

Disarming the system is achieved by pressing button #1 or button #2 52*a*, 52*b* on the remote transmitter 50. If button #1 is pressed the system will disarm with audible sounds, and if button #2 is pressed the system will disarm without audible sounds. Once a valid code is received from the transmitter 50, the system 10 will respond as follows:

a) The siren will chirp once and the hazards will flash once.

b) The siren will chirp three times and the hazards will flash three times if intrusion was detected while the system was armed.

c) The siren will chirp four times and the hazards will flash four times if arming of the system was initiated with one of the sensors not being brought on line during the arming cycle.

d) The doors will unlock.

In both active and passive arm modes, the system LED will revert to STEADY RED when the system 10 is disarmed. In the event of the siren chirps being programmed out in the installer program, the system 10 will continue to confirm the state of the system via the hazard lights of the vehicle.

If the system 10 is inadvertently disarmed, and the system does not detect any of the doors of the vehicle being opened within 30 seconds of the vehicle being disarmed, the following events will occur: the system will begin to passively arm the system indicated by the fast flashing LED, after 30 seconds arm the system, as indicated by the slow flashing red LED, and the doors will be locked.

The sensory auto test and report is a programmable feature, and the default of the system 10 is this feature programmed in. It may be disabled in the user program mode. Each time the system 10 is armed by pressing button #1 52*a* or button #2 52*b* on the transmitter 50 the system will automatically run a complete diagnostic of all sensor and pin circuits. Should a sensor or pin circuit not come on line normally, the system will suspend arming whereby the siren will report via short high pitched bleeps at 2 second intervals to indicate that the arming cycle has been suspended due to one of the sensor or pin circuits not functioning properly.

If while in this state transmitter button #1 or #2 52*a*, 52*b* is pressed again, the siren will generate a squawk sound indicative that the system 10 has armed with one of the pin or sensor circuits faulty. If button #1 or #2 on the transmitter is not pressed, the system will rearm after a period of 1 minute accompanied by the same squawk sound.

This feature may also be used to suspend the arming cycle of the system during the arming countdown. This will occur when the system is armed and during the 30 second arming countdown cycle one of the pin switches is activated, i.e., one of the doors of the vehicle is opened, the system 10 will report via short high pitched bleeps at 2 second intervals to indicate that the arming cycle has been suspended due to one of the pin circuits having been activated. As long as the associated pin switch is active, the system will maintain suspension of the arming cycle. Upon reverting the associated pin switch to its normal position, i.e., closing the door of the vehicle, the system will once again initiate the 30 second arming countdown cycle.

Upon disarming, the system 10 will report via 4 confirmation chirps and flashes on the hazards as opposed to the one chirp and flash of the hazards when disarming the system without any faulty inputs. When the system is disarmed with a faulty pin switch or sensor, the system will indicate via the system bistate LED what sensor is not functional, and simultaneously store it in the system memory so that it may be retrieved.

The security system 10 also includes false alarm auto correction sensor control. This feature is a programmable feature, and the default of the system is this feature programmed in. It may be disabled in the user program. Once the system enters the armed mode, both sensor #1 22*a* and sensor #2 22*b* can trigger the alarm condition. Once a sensor has initiated a full alarm response, and the sensor that initiated the alarm condition, be it sensor #1 or sensor #2 is activated again, then the alarm condition will respond by sounding the alarm for 10 seconds and resetting to the armed mode. Should the same sensor activate the alarm condition for the second time, the system will respond by sounding the alarm for a 5 second period and reset to the armed mode. Should the same sensor that triggered the alarm condition attempt to trigger the alarm condition for a fourth consecutive time, then the system will ignore the sensors input, that is, zone it out. Once the sensor that triggered 3 consecutive triggers (be it sensor #1 22*a*) is zoned out, the system will continue to monitor the status of sensor #2 22*b*. Should sensor #2 follow the same pattern as sensor #1, i.e., trigger the alarm condition for 3 consecutive periods, then the microprocessor will in turn ignore sensor #2 22*b* and revert to monitoring sensor #1 22*a*. If disabled in the program mode, only the control mechanism will be removed but the system will continue to monitor sensors #1 and #2 as normal trigger inputs and if detected will initiate a full alarm response for the programmed siren duration. Sensors #1 and #2 may be programmed out in the program mode if one of the sensors are at continual fault.

A two second activation of button #1 52*a* on the remote transmitter 50 will revert the system 10 into the panic mode. The system will enter this mode regardless of the ignition of the vehicle being on or off. The following scenarios are taken into account. If the system is disarmed with ignition off and panic activated (driver inside vehicle), the doors of the vehicle will lock, and the system will enter the panic cycle. If the system 10 is in drive mode (ignition on) and the panic activated (vehicle being driven), the doors will lock if the doors have not been locked, and the system will enter the panic cycle. If the system 10 is armed and the panic activated (doors will be locked, system armed and the driver outside of the vehicle), the doors will unlock and the system will enter the panic cycle. Upon closing of the last door, all doors will be locked. If a siren has been activated by a trigger condition and the remote panic button is pressed, the system will revert to the panic mode. The doors will unlock and the system will enter the panic mode.

In all cases, upon the entry into a panic mode, the system 10 will sound the siren for 15 seconds, thereafter look at the ignition switch to check whether it has been switched on. If it has been switched on within 15 second period, then the system 10 will revert to whatever mode the system was in prior to the panic mode being initiated. If the ignition switch has not been switched on during the 15 second period, then the siren will sound for a further 15 seconds whereafter it will return to its previous mode.

In the panic mode, the vehicle security system 10 will allow the driver of the vehicle to start the vehicle. This is provided to allow the driver of the vehicle to make a quick escape. In all the cases mentioned, the momentary pressing of the arm/disarm button on the remote transmitter 50 will cancel the panic state. If the vehicle is being driven, pressing the arm/disarm button momentarily will revert the system to free mode. If the panic state has been activated accidentally while the system is in the armed state, upon expiry of the panic cycle, the system will revert to the passive arming cycle for 30 seconds and then revert to the armed state and lock the doors. In the panic cycle whenever activated, the hazards will flash in unison with the siren.

The remotely activated valet (partial valet) operates as follows. When button #4 52*d* on the transmitter 50 is pressed for 2 seconds while in the disarmed mode (steady RED LED), the system will enter into a partial valet condition. Upon entering the partial valet condition, the system bi-state LED will flash GREEN. Upon this mode being entered, the system 10 will maintain full operational status with the exception of the following trigger functions:

Sensor trigger #1
Sensor trigger #2
Pre-Warn
Door switches
Ignition input

Should the trunk and hood be tampered with in the partial valet mode, the system 10 will sound the siren and flash the hazards for the programmed siren duration. The following functions will still be available in the partial valet condition:

Auxiliary #1 -#4 outputs
Key in sensor
Trunk input
Hood input
Siren output
Bi-state LED
Pager output
Dome light output
Indicator output
Central lock output
Armed output 500 mA To exit the partial valet condition, button #4 52*d* on the transmitter 50 is pressed again when the system is in the partial valet mode (flashing GREEN LED).

In addition to entry into the full valet as discussed above, a full valet condition in the disarmed state may alternately be entered as follows. The full valet condition is achieved by depressing the valet button for 4 seconds while the system 10 is disarmed with the ignition switch of the vehicle in the on position. If the ignition switch of the vehicle is off, the system 10 will not register the valet button 27 but instead detect valet forgery.

Once the full valet condition has been entered into, the system LED will light up STEADY GREEN and no operational functions will be available from the system. When the ignition switch of the vehicle is turned to the on position, the system LED will light up orange. To revert the system back to its original condition, the valet button 27 is once again depressed momentarily while the ignition of the vehicle is in the on position.

Entering the full valet condition while the system is in the armed state occurs normally when the owner of the vehicle has lost the remote controls 50 to the system, or the remote controls to the system are not functional. In this case, the system will be armed and the operator unable to deactivate the system. Upon entering the vehicle in the armed state a full alarm trigger to the system will occur. A signature valet code is programmed into the system in the installer programming set-up. The default of the system is 3 counts. During this cycle the user must observe the following procedure to enter the system into a full valet condition:

1. The ignition switch of the vehicle must be turned to the on position.
2. The valet button must be momentarily pressed either the default 3 times, or the programmed n times that was selected in the installer set-up mode.
3. The system will now enter the full valet mode condition, or another iteration of turning the ignition off then on, followed by pressing the valet switch a second number of times may optionally be selected.
4. All functions on the system will now be overridden and the system bi-state LED will revert to a STEADY GREEN state.

To revert the system back to its original condition, the valet button is depressed momentarily while the ignition of the vehicle is in the on position.

The vehicle security system may also include signature valet forgery detect and alert features for attempting to initiate a full valet condition with the ignition switch in the off position with the system disarmed. If the system is in the disarmed state, and attempt is made to initiate a full valet condition without first turning the ignition switch to the on position, the system will respond as following:

1. The system will flash the interior and hazard lights for 30 seconds. During this period the system will not recognize the valet switch 27.
2. Upon expiry of the 30 second period an attempt can once again be made to initiate a full valet condition.
3. If upon the second attempt at attempting to initiate a full valet condition without first turning on the ignition switch, the system will once again flash the interior and hazard lights for 30 seconds.

4. If upon the third attempt at trying to initiate a full valet condition without first turning on the ignition switch, the system will flash the interior lights and hazards for 1 minute after which the system will automatically begin passive arming after which the system will enter the fully armed state.

If attempt is made to initiate a full valet condition while the system 10 is in the armed mode without adhering to the conditions of a full valet system in the armed mode, i.e., not entering the correct valet code, and without activating the alarm condition, the system will start a timer for 60 seconds, and flicker the dome light and not the hazards, as these have already been switched on by the activation of the alarm condition, i.e., the opening of the doors.

During the 60 second period, the system 10 will not switch to the valet mode. Upon the expiry of the 60 second timer, the system will switch off the dome light, pager and siren, return the system to the armed state, (slow flashing red LED), and flash the interior and hazard lights for 1 minute and turn on the siren for 1 minute.

Upon the expiry of the alarm cycle, the system 10 will revert to passively arming the system followed by fully arming the system.

An intrusion attempt warn away feature can be initiated in the following cases: if the system 10 is disarmed, and the system detects an attempt at intrusion from a shock sensor, the system will immediately begin to passively arm the system. If the system is armed (slow flashing RED LED), and an attempt at intrusion is detected, the system will chirp the siren 3 times accompanied by 3 flashes on the hazards. In both the above cases, upon disarming the system the system will chirp the siren 3 times and flash the hazards 3 times.

Upon selecting the intrusion attempt retention feature from the user program mode, this feature allows the user to determine whether or not the alarm was activated in their absence, and if so, which input triggered the alarm condition. The system 10 will store the 5 most current events that activated the alarm condition. Once 5 events have been stored, the sixth event will cause the system to erase the first event (LIFO—Last In First Out). While in this mode, the number of flashes and color of the bi-state LED will indicate what input triggered the alarm.

Outlined below is a table indicating the number of flashes of the LED and color versus the input that caused the trigger.

| LED Flashes | Color | Alarm Input |
|---|---|---|
| 2 | Green | Sensor trigger #1 |
| 3 | Green | Sensor trigger #2 |
| 4 | Red | Trunk |
| 5 | Red | Hood |
| 7 | Red | Ignition |
| 6 | Red | Doors |

Entry into the User Program Mode is achieved by the following procedure: turn the ignition switch of the vehicle to the on position, press the valet switch 27 and hold for four seconds and release. The vehicle security system 10 is now in the full valet mode indicated by a steady ORANGE LED. The valet switch 27 is pressed and held for a further four seconds and released. The system 10 will confirm audibly via the siren and visually via the bi-state LED that the system is in the User Program Mode. While in this mode, the valet button 27 is kept depressed and button #4 **52*d*** on the transmitter is pressed to enter the installer program mode. In either program mode, the system will revert to a steady GREEN LED which is the first mode in the program. An alarm chirp confirms the number.

Momentarily pressing the valet switch 27 and releasing it will increment the program mode to the next feature. The net result is that the valet switch is used to scroll down the customer or installer set-up menu. Each time the valet switch 27 is pressed, the LED 34 mounted in the valet switch housing will change color associated with the feature selected. Button #1 **52*a* on the transmitter 50 may then be used to select between the factory default settings and the programmable setting. Once the customer program mode has been accessed, and no input is selected by the microprocessor for a period of 30 seconds, the system will revert to the disarmed state. In addition, to exit the program mode, the valet switch 27** may be depressed for 4 seconds. The system will indicate visually and audibly that the system us out of the program mode. The user can exit the program mode at any given time by following the above procedure.

The vehicle security system 10 may be totally reset by observing the following procedure. With power to the system off: insert the key into the ignition switch, turn the ignition switch to the on position, press and hold depressed the Valet switch 27, and turn the power to the system on. The bi-state LED will light up ORANGE. Then press the second function button 53 on the transmitter and thereafter button #4 **52*d* on the transmitter. The LED will light up GREEN while the code from the transmitter 50** is being learned, thereafter the LED will extinguish.

Further information relating to the vehicle security system may be found in copending patent applications filed concurrently herewith and entitled: Vehicle Security System Having Enhanced False Alarm Compensation, attorney work docket no. 95-P-15910; Vehicle Security System Having Enhanced Remote Transmitter Security, attorney work docket no. 95-P15910.7; and Vehicle Security System Having Enhanced Vehicle Door Locking Features, attorney work docket no. 95-P-15910.8. All of these applications are assigned to the assignee of the present invention and incorporated herein by reference in their entirety.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle security system comprising:

a controller for performing a predetermined one of a plurality of functions responsive to receipt of a predetermined command signal; and a remote transmitter for sending to said controller a predetermined command signal from a plurality of banks of command signals, said remote transmitter comprising command means comprising a plurality of first momentary contact switches and means associated with each switch of said plurality of first momentary contact switches for transmitting a first respective command signal responsive to depressing each switch for less than a first time period and for transmitting a second respective command signal responsive to depressing each switch for more than the first time period, respective first and second command signals for said plurality of first switches defining a corresponding bank of command signals from the plurality of banks of command signals, and bank selector means operatively connected to said command means and comprising a second switch and means associated therewith for selecting one of the plurality of banks of command signals for said command means.

2. A vehicle security system according to claim 1 wherein said second switch is a momentary contact switch, and wherein said means associated with said second switch comprises means for incrementing to a next bank of command signals responsive to depressing said second momentary contact switch for less than a second time.

3. A vehicle security system according to claim 2 further comprising display means for indicating the bank of command signals currently selected responsive to depressing said second switch for more than the second time.

4. A vehicle security system according to claim 1 further comprising means for transmitting a respective command signal responsive to release of a depressed one of said plurality of first momentary contact switches.

5. A vehicle security system according to claim 4 further comprising a light and drive means associated therewith for lighting said light only for a duration of transmission of a predetermined command signal.

6. A remote transmitter for sending predetermined command signals from a plurality of banks of command signals to a vehicle security system controller, said remote transmitter comprising:

a housing;

command means carried by said housing and comprising a plurality of first momentary contact switches and means associated with each switch of said plurality of first momentary contact switches for transmitting a first respective command signal responsive to depressing each switch for less than a first time period and for transmitting a second respective command signal responsive to depressing each switch for more than the first time period, respective first and second command signals for said plurality of first switches defining a corresponding bank of command signals from the plurality of banks of command signals; and bank selector means operatively connected to said command means and comprising a second switch and means associated therewith for selecting one of the plurality of banks of command signals for said command means.

7. A remote transmitter according to claim 6 wherein said second switch is a momentary contact switch, and wherein said means associated with said second switch comprises means for incrementing to a next bank of command signals responsive to depressing said second momentary contact switch for less than a second time.

8. A remote transmitter according to claim 7 further comprising display means for indicating the bank of command signals currently selected responsive to depressing said second switch for more than the second time.

9. A remote transmitter according to claim 6 further comprising means for transmitting a respective command signal responsive to release of a depressed one of said first plurality of momentary contact switches.

10. A remote transmitter according to claim 9 further comprising a light and drive means associated therewith for lighting said light only for a duration of transmission of a command signal.

11. A method for operating a remote transmitter of a vehicle security system for sending predetermined command signals from a plurality of banks of command signals to a vehicle security system controller, the remote transmitter comprising a plurality of first momentary contact switches, said method comprising the steps of:

transmitting a first respective command signal responsive to depressing each of the plurality of first momentary contact switches for less than a first time period and transmitting a second respective command signal responsive to depressing each switch for more than the first time period, respective first and second command signals for the plurality of first switches defining a corresponding bank of command signals from the plurality of banks of command signals; and selecting one of the plurality of banks of command signals for the plurality of first momentary contact switches.

12. A method according to claim 11 wherein the step of selecting one of the banks of command signals comprises the steps of:

providing a second momentary contact switch; and incrementing to a next bank of command signals responsive to depressing the second momentary contact switch for less than a second time.

13. A method according to claim 12 further comprising the step of indicating the bank of command signals currently selected responsive to depressing the second switch for more than the second time.

14. A method according to claim 11 wherein the step of transmitting comprises transmitting a respective command signal responsive to release of a depressed one of the plurality of first momentary contact switches.

15. A method according to claim 11 further comprising the step of reverting back to a predetermined bank of command signals responsive to a failure to depress one of the plurality of first momentary contact switches within a third time.

16. A vehicle security system comprising:

at least one vehicle sensor;

alarm indication means for indicating an alarm at the vehicle;

a valet switch accessible to a user within the vehicle; and a controller operatively connected to said at least one vehicle sensor, said alarm indication means, and said valet switch, said controller switchable between an armed mode, a disarmed mode, and a valet mode, said controller in the armed mode being capable of generating an alarm responsive to triggering of said at least on vehicle sensor, said controller in the disarmed mode preventing generation of an alarm responsive to triggering of said at least on vehicle sensor and switching to the armed mode in response to the elapse of a predetermined time period, said controller in the valet mode preventing generation of an alarm responsive to triggering of said at least one vehicle sensor, said controller further comprising ignition monitoring means for determining whether a vehicle ignition switch is in an off position or an on position, and valet control means for permitting switching to the valet mode responsive to activating said valet switch when said controller is in the disarmed mode and when said ignition switch is in the off position.

17. A vehicle security system according to claim 16 wherein said controller further comprises signature valet means for permitting entry into one of the valet and disarmed modes from the armed mode only if the vehicle ignition switch is on, and the valet switch is activated a predetermined plurality of times within a predetermined time.

18. A vehicle security system according to claim 17 wherein said signature valet means further comprises selection means for permitting user selection of the predetermined number of times for activation of said valet switch to enter one of the valet and disarmed modes from the armed mode.

19. A method for operating a vehicle security system comprising of a controller switchable between an armed mode, a disarmed mode, and a valet mode, the controller in the armed mode being capable of generating an alarm responsive to triggering of at least one vehicle sensor, the controller in the disarmed mode preventing generation of an alarm responsive to triggering of the at least one vehicle sensor and switching to the armed mode in response to the elapse of a predetermined time period, the controller in the valet mode preventing generation of an alarm responsive to triggering of at least one vehicle sensor, the method comprising the steps of:

providing a valet switch accessible to a user within the vehicle; and switching to the valet mode responsive to activating the valet switch when the controller is in the disarmed mode and irrespective of whether a vehicle ignition is in an on or off position.

20. A method according to claim 19 further comprising the step of entering into one of the valet and disarmed modes from the armed mode only if the vehicle ignition switch is in the on position, and the valet switch is activated a predetermined plurality of times within a predetermined time.

21. A method according to claim 20 further comprising the step of selecting the predetermined number of times for activation of the valet switch to enter one of the valet and disarmed modes from the armed mode.

22. A vehicle security system comprising:

at least one vehicle sensor;

alarm indication means for indicating an alarm at the vehicle;

a valet switch accessible to a user within the vehicle; and a controller operatively connected to said at least one vehicle sensor, said alarm indication means, and said valet switch, said controller switchable between an armed mode, a disarmed mode, and a valet mode, said controller in the armed mode being capable of entering an alarm responsive to triggering of said at least on vehicle sensor, said controller in the disarmed mode preventing generation of an alarm responsive to triggering of said at least on vehicle sensor and switching to the armed mode after a predetermined time period, said controller in the valet mode preventing generation of an alarm responsive to triggering of said at least one vehicle sensor, said controller further comprising ignition monitoring means for determining whether a vehicle ignition switch is in an off position or an on position, valet control means for permitting switching to the valet mode responsive to activating said valet switch when said ignition switch is in one of the on position and off position and said vehicle controller is in the disarmed mode, and signature valet means for permitting entry into one of the valet and disarmed modes from the armed mode only if the vehicle ignition switch is on, and the valet switch is activated a predetermined plurality of times within a predetermined time period.

23. A vehicle security system according to claim 22 wherein said signature valet means further comprises selection means for permitting user selection of the predetermined number of times for activation of said valet switch to enter one of the valet and disarmed modes from the armed mode.

24. A method for operating a vehicle security system comprising a controller switchable between an armed mode, a disarmed mode, and a valet mode, the controller in the armed mode being capable of generating an alarm responsive to triggering of a least one vehicle sensor, the controller in the disarmed mode preventing generation of an alarm responsive to triggering of the at least one vehicle sensor and switching to the armed mode after a predetermined time period, the controller in the valet mode preventing generation of an alarm responsive to triggering of the at least one vehicle sensor, the method comprising the steps of:

providing a valet switch accessible to a user within the vehicle;

switching to the valet mode responsive to activating the valet switch when a vehicle ignition switch is in one of an on position and an off position and the controller is in the disarmed mode; and entering into one of the valet and disarmed modes from the armed mode only if the vehicle ignition switch is in the on position, and the valet switch is activated a predetermined plurality of times within a predetermined time period.

25. A method according to claim 24 further comprising the step of selecting the predetermined number of times for activation of the valet switch to enter one of the valet and disarmed modes from the armed mode.

* * * * *